United States Patent
Alger-Meunier et al.

[19]

[11] Patent Number: 5,940,386
[45] Date of Patent: Aug. 17, 1999

[54] WIRELESS TRANSMISSION SYSTEM BETWEEN BASE STATIONS AND A MOBILE TERMINAL STATION

[75] Inventors: Michael Alger-Meunier, Haar; Yousif Ammar, Moosach, both of Germany

[73] Assignee: Siemens Aktiengesellschaft, Munich, Germany

[21] Appl. No.: 08/753,364

[22] Filed: Nov. 25, 1996

[30] Foreign Application Priority Data

Nov. 23, 1995 [DE] Germany .......................... 195 43 841

[51] Int. Cl.⁶ ....................................................... H04J 3/06
[52] U.S. Cl. ............................................................. 370/350
[58] Field of Search .................................... 370/350, 341, 370/328, 503, 527, 529, 509, 510, 512, 517, 522, 524, 310, 465, 466, 467, 342, 441, 442, 320, 335, 479, 480; 455/67.1, 528, 411, 15, 436; 380/49, 48

[56] References Cited

U.S. PATENT DOCUMENTS 5,481,545  1/1996  Maedjaja et al. .................... 370/341

FOREIGN PATENT DOCUMENTS 0 671 825      9/1995   European Pat. Off. .
43 15 621 A1  11/1994  Germany .
43 33 000 A1   4/1995  Germany .

*Primary Examiner*—Dang Ton
*Attorney, Agent, or Firm*—Herbert L. Lerner; Laurence A. Greenberg

[57] ABSTRACT

A transmission system includes a central station, a counterpart station and at least two base stations connected to the central station through at least one interface. The base stations wirelessly exchange signals with at least one mobile terminal station. At least one Uko standard interface is expanded by a device for transmitting and delaying synchronizing signals, in such a way that a transmission of the at least one Uko interface that is synchronized with the other interfaces is attained.

8 Claims, 1 Drawing Sheet

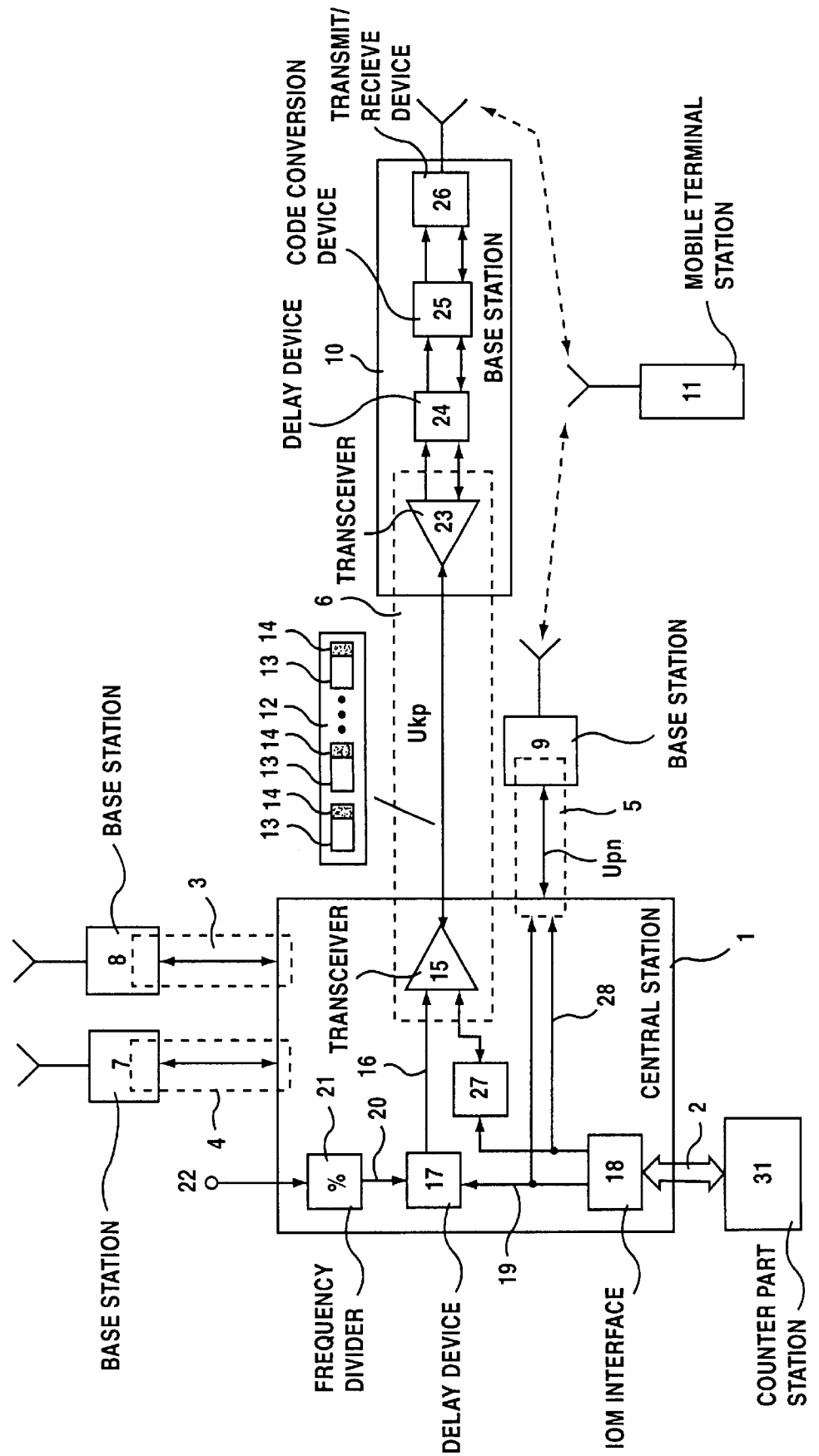

WIRELESS TRANSMISSION SYSTEM BETWEEN BASE STATIONS AND A MOBILE TERMINAL STATION

BACKGROUND OF THE INVENTION

FIELD OF THE INVENTION

The invention relates to a transmission system including a central station connected to a counterpart station, at least two base stations connected to the central station through at least one interface, the base stations wirelessly exchanging signals with at least one mobile terminal station, signals output by the counterpart station being transmitted through the central station and the base stations to the terminal station, and signals output by the terminal station being transmitted through the base stations and the central station to the counterpart station.

Modern architectures of private secondary-station systems allow the connection of base stations by the DECT standard (DECT=Digital European Cordless Telephone) through the use of a digital interface by various methods with a constant or negligible transmit time, such as by the Upn standard, to the central station. The prerequisite is that at the transition of the mobile terminal station from one base station to another during the conversation, the data flow is synchronized at all of the base stations. In that connection, synchronized is understood to mean that the data which are transmitted in one frame by the DECT standard from the central station to various base stations through various interfaces appear in the air with a chronological offset from one another of less than 4 µs.

In order to attain such synchronicity, a synchronizing pulse triggered by the frame clock under the DECT standard is, for instance, transmitted through the Upn standard interfaces to the base stations with a certain delay. At the Upn standard interface, a so-called T-bit is provided. The transmission of the T-bit is chronologically fixedly coupled in a certain way with an integrated services digital network oriented modular (IOM) interface. As a result, the transmission of the T-bit is made possible through a plurality of Upn standard interfaces, which are connected to the IOM interface. That in turn means that those base stations start synchronously.

However, a disadvantage of the Upn standard interfaces is their relatively short range. Interfaces under the Uko standard, for instance, allow a ten times greater distance between the central station and the base station, by comparison. However, Uko standard interfaces have neither a T-bit nor a defined chronological relationship with the IOM interface in the transmission.

SUMMARY OF THE INVENTION

It is accordingly an object of the invention to provide a transmission system, which overcomes the hereinafore-mentioned disadvantages of the heretofore-known devices of this general type and which allows a greater distance between a central station and base stations.

With the foregoing and other objects in view there is provided, in accordance with the invention, a transmission system, comprising a central station; a counterpart station connected to the central station; at least one mobile terminal station; at least one interface connected to the a central station; at least two base stations connected through the at least one interface to the central station, the at least two base stations wirelessly exchanging signals with the at least one mobile terminal station; the counterpart station outputting signals transmitted through the central station and the base stations to the at least one mobile terminal station; the at least one mobile terminal station outputting signals transmitted through the base stations and the central station to the counterpart station; at least one of the interfaces according to the Uko standard connected between the central station and one of the base stations; a device for transmitting synchronizing signals through the at least one interface according to the Uko standard; and a device for delaying the synchronizing signals and data streams to be transmitted, for chronologically fixedly coupling at least one of the base stations connected through the at least one interface according to the Uko standard to the central station in the same way as a remainder of the base stations.

In accordance with another feature of the invention, the device for transmitting synchronizing signals through the at least one interface according to the Uko standard, is an embedded operating channel of the at least one interface according to the Uko standard, transmitting the synchronizing signals in the form of EOC reports from the central station to at least one of the base stations connected through the at least one interface according to the Uko standard.

In accordance with a further feature of the invention, the at least one interface according to the Uko standard includes a transmission structure having a superframe with a plurality of subordinate basic frames, and there is provided a reset device resetting the basic and superframes in a defined manner upon an appearance of synchronizing signals.

In accordance with an added feature of the invention, there is provided a transmission system clock from which a master clock is derived for controlling the device for delaying the synchronizing signals.

In accordance with an additional feature of the invention, the central station has an IOM interface furnishing the synchronizing signals.

In accordance with yet another feature of the invention, the synchronizing signals are monitor commands of the IOM interface, transmitted as EOC reports to at least one of the base stations connected through the at least one interface according to the Uko standard.

In accordance with yet a further feature of the invention, the device for delaying the synchronizing signal is a delay device delaying the EOC reports in accordance with a corresponding monitor command of the IOM interface up to one edge of a master clock.

In accordance with yet an added feature of the invention, least one of the base stations has a code conversion device converting reports received through the at least one interface according to the Uko standard, to an IOM standard.

The invention makes it possible to use Uko standard interfaces along with other interfaces, such as those under the Upn standard but with a greater range, while assuring synchronized operation with the other interfaces.

Other features which are considered as characteristic for the invention are set forth in the appended claims.

Although the invention is illustrated and described herein as embodied in a transmission system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWING

The FIGURE of the drawing is a block circuit diagram of an exemplary embodiment of the invention.

DESCRIPTION OF THE PREFERRED EMBODIMENTS

Referring now in detail to the single figure of the drawing, there is seen an exemplary embodiment of a transmission system which includes a central station 1, such as a central unit of a private secondary station system, and a counterpart station 31 connected thereto, for instance through a PCM bus 2. Base stations 7, 8, 9, 10 are also each connected through a respective interface 3, 4, 5, 6 to the central station 1. The base stations 7, 8, 9, 10 can exchange signals wirelessly with a mobile terminal station 11.

In the present exemplary embodiment, the mobile terminal station 11 communicates with the base stations 9 and 10. In the same way, however, communication with the other base stations 7 and 8 and the use of further mobile terminal stations are also possible. The central station 1 and the interfaces 5 and 6, in conjunction with the respective base stations 9 and 10 and their wireless connection to the mobile terminal station 11, enable an exchange of communications between the counterpart station 31 and the mobile terminal station 11 through the PCM bus 2.

According to the invention, the interface 6 is constructed as a Uko interface, in which a device for transmitting synchronizing signals, a device for delaying these synchronizing signals and a device for delaying data streams to be transmitted, are provided. The transmission and delaying of the synchronizing signals and the delaying of the data streams are effected in such a way that the base station 10 connected through the Uko interface 6, in the same way as the other base stations 7, 8 and 9, is fixedly coupled chronologically to the central station 1, or in other words it transmits and receives synchronously with it. The interface 5 is, for instance, a Upn interface. The interfaces 3 and 4 may arbitrarily be identical to either the Upn interface 5 or the Uko interface 6.

Since no suitable bit for transmitting the synchronizing signals is available at the Uko interface 6, the embedded operating channel (EOC) is used as a device for transmitting the synchronizing signals. EOC reports which form synchronizing signals on this channel are transmitted from the central station 1 to the base station 10.

The structure of the Uko interface for 2B1QDSL (see ANSI T1E1, 4/92-004) provides a 12 ms superframe 12, which in turn includes eight subordinate basic frames 13. An EOC channel 14 is formed by the last four bits of each basic frame 13. A reset device resets the basic and superframes upon the appearance of a synchronizing signal. The resetting is effected through the use of a transceiver unit 15 of the Uko interface 6 in the central station 1. The next basic frame 13 or the next superframe 12 is transmitted through the use of the transceiver unit 15, after the appearance of a synchronizing signal. Synchronizing signals 16 are furnished by a delay device 17, which in turn receives a monitor command 19 from an integrated services digital network oriented modular (IOM) interface 18 and buffer-stores this command until such time as the next trailing edge, for instance, of a master clock 20 appears. It is not until that moment that the monitor command 19 is passed on, as a synchronizing signal 16, to the transceiver unit 15. The master clock 20 is obtained through the use of a frequency divider unit 21 from the system clock 22 of the transmission system. Consequently, the frame signal is transmitted in a fixed chronological relationship with the master clock 20.

The base station 10 connected to the central station 1 through the Uko interface 6 includes not only a transceiver 23 as a termination of the Uko interface 6, but also a delay device 24 for delaying the data stream in the receiver direction or in both directions, and a code conversion device 25 which is connected with a transmit and receive device 26 for wireless transmission of signals to or from the mobile terminal station 11. The code conversion device 25 converts signals for the transmit-receive device 26 in such a way that they correspond to the base station 9. Signals received from the transmit-receive device 26 are also prepared by the code conversion device 25 for transmission through the Uko interface 6. The delay device 24 serves to equalize the signal transmit time of the Upn interface 5, which is at least 4 µs, and an additional line-length-dependent transit time. The corresponding transit time equalization for the synchronizing signal is already jointly assured by the delay device 17.

Data streams 28 to be transmitted are furnished in the central station 1 by the IOM interface 18 and furnished to the transceiver unit 15 of the Uko interface 6 through the use of a code conversion device 27 for converting the IOM code to the Uko code, and vice versa. Both the data stream and the monitor command 19 are supplied directly to the Upn interface 5. The base stations 7 and 8 and the associated wiring in the central station 1 are each identical to the base station 9 or 10, depending on whether their interfaces 3 and 4 are constructed according to the Uko standard or the Upn standard.

We claim:

1. A transmission system, comprising:

a central station;

a counterpart station connected to said central station;

at least one mobile terminal station;

at least one interface connected to said central station;

at least two base stations connected through said at least one interface to said central station, said at least two base stations wirelessly exchanging signals with said at least one mobile terminal station;

said counterpart station outputting signals transmitted through said central station and said base stations to said at least one mobile terminal station;

said at least one mobile terminal station outputting signals transmitted through said base stations and said central station to said counterpart station;

at least one of said interfaces according to the Uko standard connected between said central station and one of said base stations;

a device for transmitting synchronizing signals through said at least one interface according to the Uko standard; and a device for delaying the synchronizing signals and data streams to be transmitted, for chronologically fixedly coupling at least one of said base stations connected through said at least one interface according to the Uko standard to said the central station in the same way as a remainder of said base stations.

2. The transmission system according to claim 1, wherein said device for transmitting synchronizing signals through said at least one interface according to the Uko standard, is an embedded operating channel of said at least one interface according to the Uko standard, transmitting the synchronizing signals in the form of embedded operating channel reports from said central station to at least one of said base stations connected through said at least one interface according to the Uko standard.

3. The transmission system according to claim 1, wherein said at least one interface according to the Uko standard includes a transmission structure having a superframe with a plurality of subordinate basic frames, and including a reset device resetting said basic and superframes in a defined manner upon an appearance of synchronizing signals.

4. The transmission system according to claim 1, including a transmission system clock from which a master clock is derived for controlling said device for delaying the synchronizing signals.

5. The transmission system according to claim 1, wherein said central station has an integrated services digital network oriented modular interface furnishing the synchronizing signals.

6. The transmission system according to claim 5, wherein the synchronizing signals are monitor commands of said integrated services digital network oriented modular interface, transmitted as embedded operating channel reports to at least one of said base stations connected through said at least one interface according to the Uko standard.

7. The transmission system according to claim 6, wherein said device for delaying the synchronizing signal is a delay device delaying the embedded operating channel reports in accordance with a corresponding monitor command of said integrated services digital network oriented modular interface up to one edge of a master clock.

8. The transmission system according to claim 6, wherein at least one of said base stations has a code conversion device converting reports received through said at least one interface according to the Uko standard, to an integrated services digital network oriented modular standard.

* * * * *